Nov. 15, 1960

W. LUDIN 2,960,323

SHAFT KILN

Filed May 26, 1954

INVENTOR:
WERNER LUDIN

Nov. 15, 1960 W. LUDIN 2,960,323
SHAFT KILN

Filed May 26, 1954 3 Sheets-Sheet 2

INVENTOR.
WERNER LUDIN

Nov. 15, 1960 W. LUDIN 2,960,323
SHAFT KILN

Filed May 26, 1954 3 Sheets-Sheet 3

INVENTOR.
WERNER LUDIN
BY

United States Patent Office 2,960,323
Patented Nov. 15, 1960

2,960,323

SHAFT KILN

Werner Ludin, Zurich, Switzerland, assignor to L. von Roll A.G., Zurich, Switzerland, a Swiss company Filed May 26, 1954, Ser. No. 432,542

Claims priority, application Switzerland May 28, 1953

5 Claims. (Cl. 263—29)

The present invention relates to a shaft kiln for the burning of cement, lime, dolomite and similar substances, as well as for the sintering and reducing of ores, the material to be burnt being fed to the vertical kiln shaft from above in a continuous flow and passing inside the shaft through at least one sintering zone and then one cooling zone. This shaft kiln is arranged at its top end with at least one combustion chamber for liquid and gaseous fuels for the purpose of producing hot gases, the chamber being, however, screened on all sides from the kiln shaft and only connected to the latter via a plurality of hot gas ducts, among which are to be found those leading into the sintering zone of the kiln shaft.

It has long been known to carry out the burning of lime and similar raw materials in shaft kilns by means of gaseous or liquid fuel introduced directly into the kiln shaft, but no suitable construction previous to this invention existed for the burning of cement raw meal. This is due primarily to the cement raw meal's great sensitivity to overheating and also to the absolute necessity of maintaining a definite minimum temperature. To sinter cement raw meal completely, it is necessary to burn the initial material within relatively narrow temperature limits, which is of far lesser importance in the case of lime and similar substances.

It is only with the use of solid fuels such as anthracite or coke breeze that shaft kilns have so far been employed for the sintering of cement raw meal, a homogeneous mix being produced from ground breeze and cement raw meal and then formed into briquettes. The fuel constituents in the briquettes are burned up inside the shaft kiln, thus causing a corresponding development of heat in direct contact with the cement raw meal, which exerts a favourable influence on the quality of the final products and on the economy of the process.

In contrast to this, the shaft kiln envisaged in the present invention possesses a shaft which is indirectly heated by liquid and gaseous fuels and which enables even sensitive materials such as cement raw meal to be processed. Preceding the actual kiln shaft are combustion chambers which are connected to the shaft solely via feed ducts for the hot combustion gases, thus avoiding any transfer of heat caused by the action of the flames or radiation from the combustion chamber. Due to the fact that the stream of hot gas is simple to regulate, the relatively narrow limits for the burning temperature can be maintained.

The shaft kiln according to the invention can also be used to advantage for sintering and reducing ores.

The shaft kiln according to the present invention will now be described in conjunction with the appended drawings, wherein.

Figure 1:
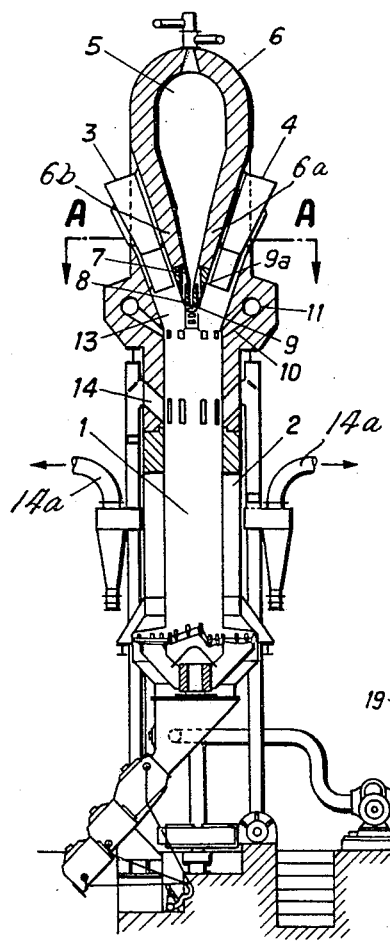
Figs. 1 and 2 are front and side elevational views respectively of a typical embodiment of the shaft kiln according to the present invention, partly shown in longitudinal section.
Figure 2:
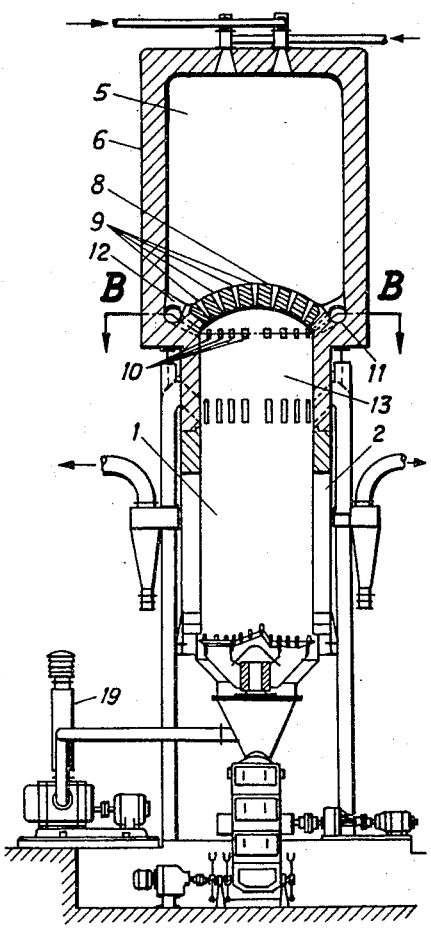
Figure 3:
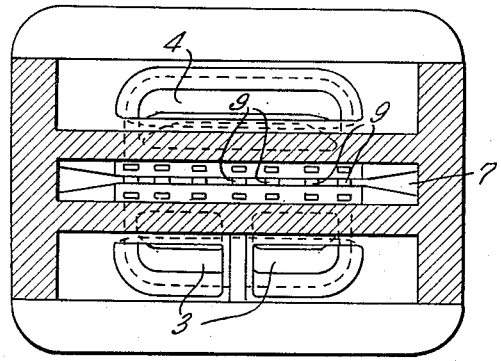
Fig. 3 is a horizontal sectional view taken along the line A—A through the shaft kiln shown in Fig. 1 and being in an enlarged scale.
Figure 4:
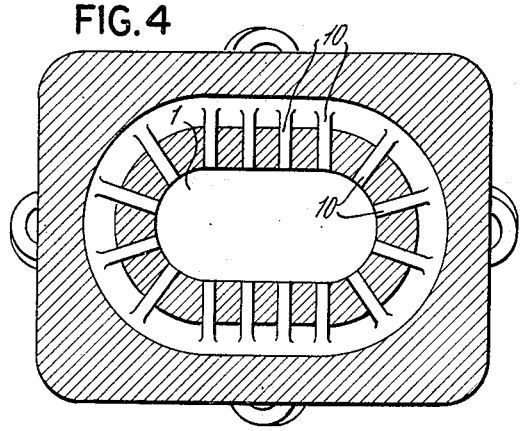
Fig. 4 is an enlarged horizontal sectional view taken along the line B—B in Fig. 2.
Figure 5:
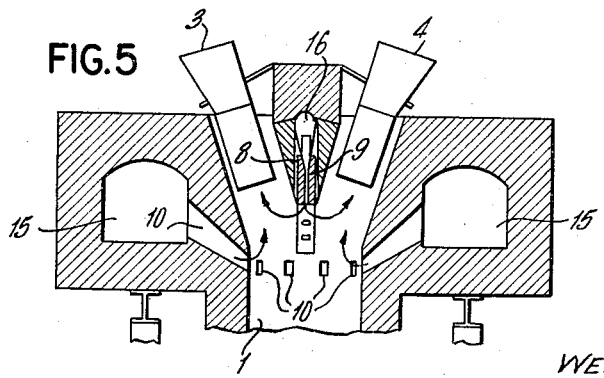
Fig. 5 shows another typical embodiment of the upper part of a shaft kiln according to the present invention in elevation and longitudinal section.
Figure 6:
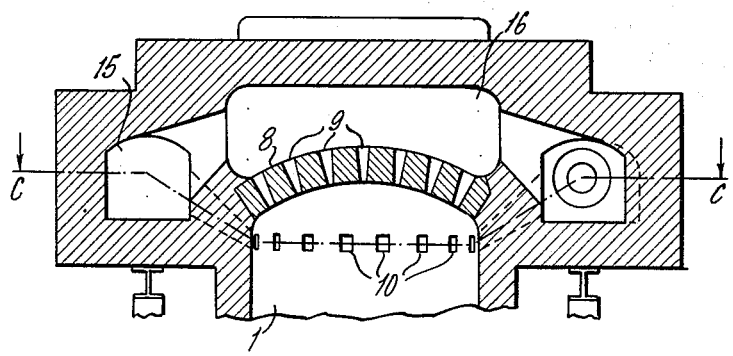
Fig. 6 is a side view of the shaft kiln shown in Fig. 5, in longitudinal section.
Figure 7:
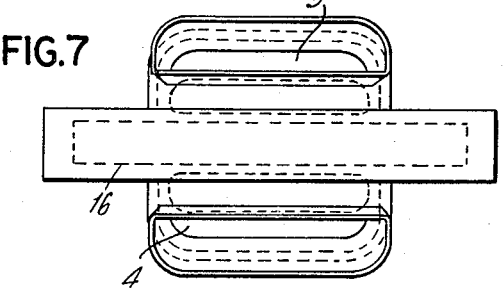
Fig. 7 is a plan view of the shaft kiln in Fig. 5.

Since, as has already been mentioned, it is necessary with processes of this description to maintain narrow temperature limits at least in the sintering zone of the shaft kiln, the material to be sintered must under no circumstances be inside the combustion chambers for the liquid and gaseous fuels, because direct contact with the flames and the radiation heat causes, as experience has shown, fairly large variations in the temperature of the material, particularly at its surface. Since this type of direct transfer of heat is not sufficiently controllable and fluctuates too much for the present requirements, a stream of hot gases is used as the unique source of heat for the sintering process. The heat is thus transferred almost exclusively by convection via a gaseous heat carrier, radiation heating of the material being largely abandoned. This ensures, if the hot gases are suitably guided, that all parts of the material to be sintered will be uniformly heated.

The production of hot gases, carried out in one or several special combustion chambers, enables a better check to be kept on the temperature and quantity of the heat carrier fed to the sintering zone than is possible in conventional shaft kilns using solid fuel or in those shaft kilns known hitherto in which liquid or gaseous fuels are introduced directly into the shaft or into chambers in direct connection with the said shaft.

For instance, it is well-known in the case of cement shaft kilns operated on solid fuel that there is always a certain difficulty in carrying out the sintering process as completely in the middle of the shaft as at the edge. This lack of uniformity is caused by the well-known tendency for a large proportion of the cooling or combustion air to flow up the walls, since in this marginal zone the layer of material is constantly loosened by friction with the wall and thus a relatively smaller resistance to flow is formed than in the middle zone. There is therefore always a tendency for the middle zone to be short of air whilst the marginal zone tends to have a surplus of air. In the usual shaft kilns, however, in which fuel gases are introduced together with combustion air directly into the column of the material, i.e. into the intermediate spaces between the nodules or briquettes, or in which liquid or gaseous fuels are burnt up in hollow chambers which are in direct connection with the shaft, the difficulty arises of producing the adequate mixture of combustion air and fuel which would be required to achieve a uniform combustion temperature. In the first case there will always be zones in the column of material which show a surplus of air and others which show a lack of air, and in the second case the combustion temperature will be unevenly influenced by radiation directed at the colder column of raw material and, at the same time, at the warmer walls of the combustion chamber.

In the present shaft kiln one or several combustion chambers, which may consist of one or several parts, are provided for the production of the hot gases, in which chambers the liquid and gaseous fuels are burned with the addition of optimum quantities of combustion air.

These combustion chambers are, to be sure, located outside the actual kiln shaft but are arranged in its immediate neighbourhood. The combustion chambers themselves are screened on all sides from the kiln shaft so as to avoid flames and radiation exerting a direct influence on the material to be sintered. Once the hot gases are produced, they are fed, in a single stream or in several part streams, to one or even several zones of the kiln shaft. It is possible in these combustion chambers, arranged in one or several parts and separated from the kiln shaft, to create the optimum conditions in respect of space and the quantities of combustion air supplied so that a high degree of combustion efficiency can be achieved without difficulty over the entire temperature and output range used in operation.

To ensure that narrow temperature limits will be maintained when the material is being sintered, it is, however, important not only that the heat should be supplied evenly by the stream of hot gas, the temperature of which is kept uniform, but also that the heat carrier should exert an influence which is to some extent uniform on all parts of the material to be sintered. This can be achieved by reducing the maximum required depth of penetration of the hot gases into the material to be sintered, as well as by suitably designing the guide means for the hot gases. If the hot gas is fed to the sintering zone of the kiln shaft only from the latter's periphery, that is to say, via feed ducts passing through the walls of the shaft kiln, it is advantageous to reduce the depth to which the hot gas has to penetrate into the material by giving the kiln shaft a rectangular or oval cross-section. This could, however, give rise to difficulty in that the material to be sintered might be inclined to stick as a result of the narrow width of the shaft and not pass uninterruptedly down the shaft. In the present shaft kiln a wall, which is preferably arched and provided with guide ducts, is arranged according to the invention across the inside of the shaft and enables the hot gases to be fed to the nodules in the middle zone of the kiln shaft. In this way it is possible to keep the maximum required depth of penetration of the hot gases into the material to be sintered small without reducing the width of the shaft at its narrowest point to an extent which would hinder the free sliding of the material. If a round cross-section for the kiln shaft is retained, the hot gas can, however, also be fed both from the periphery of the kiln shaft wall and via a duct channelled out coaxially inside the kiln shaft so that the effective cross-section of the sintering zone is circular in shape.

The shaft kiln can be used for the processing of materials which are fed to the shaft from the top in the form of briquettes, nodules or the like. Depending on the previous treatment of the material it may be necessary to pre-dry it before it enters the actual sintering zone. For this purpose the kiln shaft possesses according to the invention a predrying zone located above the sintering zone and preferably in direct proximity to the point where the material is charged into the kiln shaft. In this predrying zone the material charged is exposed to the influence of a part stream of the gases used for sintering, or of a stream of hot gas which flows into the shaft from one or several combustion chambers. In each case the combustion chambers can be so arranged that the optimum conditions are obtained for the carrying out of the process, hot gases of different temperature being, for instance, produced in separated combustion compartments and fed to each of those points in the shaft which are considered most favorable for the carrying out of the process. It is, however, also possible to divide the stream of hot gas emerging from a single combustion chamber into several part streams, whereby the design and operation of the plant become particularly simple. One such method of supplying the hot gases will be adequate in most cases. The stream of hot gas for the sintering zone, will then, for example, consist of two part streams, the first of which will enter the kiln shaft predominantly vertically from above and will mainly impinge on the middle zones of the material filling the shaft and on the zones close to the latter's axis, whereas the other part stream, will reach the sintering zone through ducts arranged radially round the kiln wall. Furthermore it is possible with the aid of guide means to direct a part stream of either of these two streams of hot gas entering the kiln shaft against the material which is continuously being charged, in order to achieve a predrying of the said material.

The shaft kiln operated on the continuous method permits the processing of completely different materials to be sintered which require different sintering temperatures and times. Owing to the fact that the stream of hot gas supplied can be readily controlled in respect of temperature and quantity, it is possible, together with the conveyor means governing the feeding of material, to set the time the material to be sintered remains in the predrying and sintering zones at the desired amount.

A stream of gas or air is fed to the kiln shaft from its bottom end for cooling purposes. With regard to the heat economy of the entire installation it is best to use only as much air or gas for cooling purposes as is needed to cool the burnt material filling the kiln shaft in accordance with operational requirements or to prevent reoxidation, the air or gas at the end of its cooling path passing into the sintering zone and itself assuming practically the temperature prevailing there even before it reaches the said zone. In cases where it is strictly essential to maintain the sintering temperature accurately it may happen that the cooling process is better separated from the sintering. It is then advantageous to remove the cooling air or gas either wholly or partly from the shaft before it can reach the sintering zone.

In the present shaft kiln the hot gases required are produced by liquid or gaseous fuels. It must, however, be expressly pointed out that solid fuels can also be used for the purpose if they are previously gasified.

A typical embodiment of the shaft kiln according to the present invention is illustrated by Figs. 1 to 4, only one combustion chamber being shown here for the sake of simplicity, although the shaft kiln is not restricted to this. The embodiment includes a kiln shaft 1, which has here an oval cross-section and is formed by the shaft walls 2. At the top end of the kiln shaft 1 the material to be sintered is continuously fed via a conventional conveying plant, which is not described in detail here, through the two charging hoppers 3 and 4.

The combustion chamber 5, which is shown to be conical in shape in this example, for the liquid and gaseous fuels is arranged substantially entirely outside and beyond the kiln shaft 1 but is located in direct proximity to the top end of the latter and is formed by the walls 6. Thus a major portion of the combustion chamber is located beyond the kiln shaft. The narrow end 7 of the conical combustion chamber faces downwards and includes converging lower wall portions 6a and 6b, stretches along the longer symmetry axis of the oval cross-section of the shaft and opens out, in the immediate proximity of the charging hoppers 3 and 4, which are part of the feed means for the material being processed, the upper end of the kiln shaft. The combustion chamber 5, however, is screened from the kiln shaft 1 by a bottom wall 8 and is only connected to the kiln shaft via the ducts 9 and 9a, through which a part stream of the hot gases produced in the combustion chamber 5 acts, largely vertically from above, on the material which fills the kiln shaft 1 until just below the charging hoppers 3 or 4. A further stream of hot gas passes via the ducts 10, which run in a radial direction through the shaft wall 2, into the interior of the kiln shaft 1. These ducts 10, evenly distributed round the periphery of the shaft wall 2, all lead to a circular duct 11, which in its turn, is connected to the combustion chamber 5 by the openings 12. The ducts 10 form a first group of ducts while the ducts 9, 9a form a second group of ducts.

The space directly beneath the charging hoppers 3 and 4 of the kiln shaft forms the predrying or preheating section 13, while the actual sintering section is located at the point where the ducts 10 open out into the kiln shaft. The predrying and sintering sections run continuously into one another, but the part stream of hot gases supplied via the ducts 9a ensures that the material is already exposed to the action of these gases immediately after it reaches the point where hoppers 3 and 4 open out into the kiln shaft.

A stream of cooling air or gas is fed to the kiln shaft 1 at its bottom end or cooling section by the blower 18. The stream of air or gas flows through the material and upwards along the kiln shaft 1 until it reaches the exhaust conduits or third group of ducts 14 forming exhaust means which run radially through the shaft wall 2. Via these ducts the said stream is conveyed wholly or partly to the outside. The heat contained in this stream of cooling air or gas can be utilized either for the thermal preparation, i.e., preheating or predrying, of the material to be charged into the shaft kiln by delivery to the preheating section conduit means 14a, or by using the stream of cooling air as combustion air in the combustion chamber 5, or by using the stream of cooling gas as a reducing agent in the hot section of the kiln shaft 1.

Figure 8:
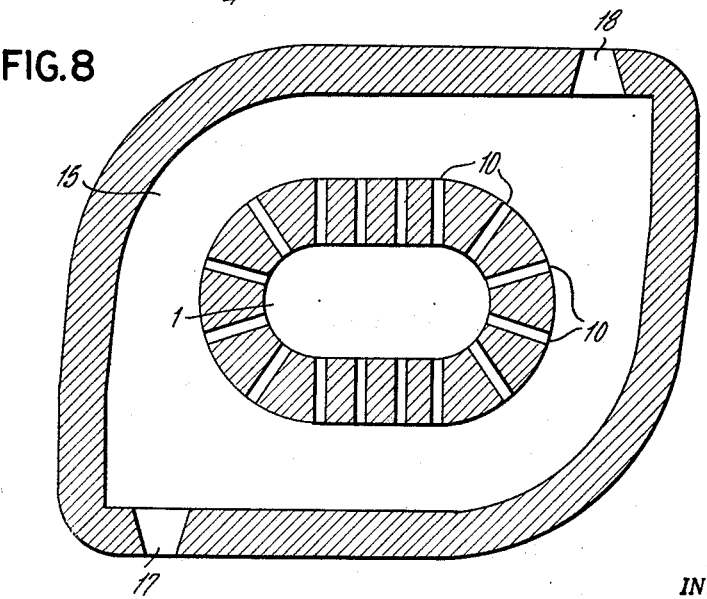
Fig. 8 is a horizontal sectional view taken along the line C—C of Fig. 6.

A further typical embodiment of a combustion chamber at the top end of the kiln shaft is illustrated in Figs. 5 to 8, in which the same parts as those shown in Figs. 1 to 4 are provided with the same reference numbers. The kiln shaft 1, which is merely indicated here and is likewise of oval cross-section, as well as the charging hoppers 3 and 4 and the feed ducts 9 and 10 for the stream of hot gas are arranged in the same way as in Figs. 1 to 4. In the present embodiment, however, the combustion chamber is designed in the form of a substantially circular duct 15 which encloses the kiln shaft at the latter's upper end like a ring. Along the longer or major axis of the oval cross-section of the kiln shaft the parts of the circular duct 15 lying opposite each other are interconnected by a cross joint 16. This cross joint 16 supplies the hot gas feed ducts 9 in the wall 8. The radial ducts 10 are in direct communication with the ring-shaped combustion chamber 15. It will be suitable here to design the combustion chamber 15 as shown in Fig. 8 in order to ensure that the fuels can be fed via the openings 17 or 18 and burnt with a high degree of efficiency in the substantially circular duct 15.

In both the typical embodiments of the combustion chambers illustrated in Figs. 1 to 4 and 5 to 8 care has been taken to see that the combustion chamber in each case is effectively screened from the kiln shaft and from the material contained in the latter and that the material is affected neither by the flames nor, to any marked extent, by the radiation of the said flames.

The construction of shaft kilns of this type presents as a rule certain difficulties in regard to the design of the joints between strongly heated and less strongly heated structural parts. In the two typical embodiments illustrated in Figs. 1 to 4 and 5 to 8 joints of this sort are largely eliminated, in that according to the invention the strongly heated structural parts, surrounding the hollow spaces through which combustion gases flow, form one enclosed structural unit.

It will be seen from the above-described kiln structure that a hollow, substantially vertical kiln shaft which has a sintering zone in its interior is combined with a combustion chamber means located substantially entirely outside of the kiln shaft, and a duct means communicates with this combustion chamber means and with the kiln shaft at its sintering zone for directing only gases from the combustion chamber means to the sintering zone.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A kiln comprising a vertical kiln shaft having a longitudinal axis and a hollow interior defined by upright side walls and including at least one sintering section adjacent the upper end of said kiln shaft and at least one cooling section between said sintering section and the lower end of said kiln shaft, feed means disposed adjacent said upper end of said kiln shaft and communicating with said interior of the latter for conducting cement, lime, dolomite, ores, and like material into said kiln shaft in a substantially continuous stream for heat treatment therein, a combustion chamber having walls including a pair of lower wall portions converging toward said longitudinal axis and directed inwardly of said upright side walls, said chamber being mounted on said side walls of said kiln shaft above said sintering section and being employable for burning fuel therein to thereby produce hot gases, and a plurality of ducts, respectively, communicating with said chamber and said sintering section of said kiln shaft, a first group of said plurality of ducts extending through said side walls of said shaft into said chamber and opening substantially radially with respect to the longitudinal axis of said kiln shaft, thereby to establish first flow paths for said hot gases emanating from said combustion chamber, a second group of said plurality of ducts being located above said first group of ducts forming a bottom of said combustion chamber and extending between said converging wall portions of said chamber downwardly to said sintering section of said kiln shaft, thereby to establish second flow paths for said hot gases from said chamber into said sintering section, said chamber being only in communication with said sintering section through both said groups of ducts so that material located in the sintering section will be exposed to said hot gases without being affected by burning fuel flames in the combustion chamber.

2. The kiln of claim 1, wherein said kiln shaft is non-circular in cross section, said chamber having a bottom wall, some of said ducts of said second group being disposed in said bottom wall, said converging wall portions terminating in a narrow bottom edge and forming a central core in said upper end of said kiln shaft.

3. In a kiln according to claim 2, said feed means for said material comprising two parts similar to each other and disposed, respectively, on opposite sides of the converging wall portions of said combustion chamber, said feed means extending angularly downwardly and inwardly with respect to the upright side walls of the kiln shaft and toward said sintering section, said first group of ducts leading from said chamber to said sintering section extending through said side walls of said kiln shaft at a level below said feed means.

4. In a kiln according to claim 1, wherein said kiln shaft defines below said sintering section a predrying section in said interior, a third group of ducts extending radially with respect to the longitudinal axis of said kiln shaft and downwardly through said side walls of said kiln shaft and opening directly into said predrying section, said third group of ducts being arranged at a common level and opening into said kiln shaft at a location which is vertically spaced below said first group of ducts.

5. The kiln of claim 1, wherein said kiln shaft defines further in its interior a preheating section above said sintering section and adjacent said feed means, said kiln shaft having an open bottom end, means communicating with said open bottom end of said kiln shaft at the lower end of said cooling section for supplying a stream of cooling gas to said kiln shaft and the material therein, exhaust means extending through said side walls of said kiln shaft intermediate said cooling and sintering sections for conveying the cooling gas heated by said material out of said kiln shaft, and conduit means communicating with and connected to said exhaust means and said preheating section for conveying at least a portion of said heated stream of cooling gas to said preheating section so that said heated cooling gas gives off a substantial part of its heat content to the material in said preheating section prior to arrival of the latter in said sintering section.

References Cited in the file of this patent

UNITED STATES PATENTS

| | | |
|---|---|---|
| 169,895 | Daish | Nov. 16, 1875 |
| 1,546,521 | Vanderstein | July 21, 1925 |
| 1,989,072 | Billinghurst | Jan. 29, 1935 |
| 2,108,118 | Greenawalt | Feb. 15, 1938 |
| 2,464,304 | Gottlieb | Mar. 15, 1949 |
| 2,594,799 | Powell | Apr. 29, 1952 |
| 2,650,814 | Howden | Sept. 1, 1953 |
| 2,788,961 | Pooley et al. | Apr. 16, 1957 |